United States Patent Office 3,037,903
Patented June 5, 1962

3,037,903
PRODUCTION OF PAPER
Heinrich Baumann, Frankenthal, Pfalz, and Fritz Graf and Franz Poschmann, Ludwigshafen (Rhine), Germany, assignors to Badische Anilin- & Soda-Fabrik Aktiengesellschaft, Ludwigshafen (Rhine), Germany
No Drawing. Filed July 14, 1958, Ser. No. 748,129
Claims priority, application Germany July 27, 1957
7 Claims. (Cl. 162—165)

This invention relates to the production of paper filled with hardened porous polycondensation products.

Many papers contain only fibrous raw material and sizing material. For many uses, however, it is necessary to add fillers. Usually finely ground mineral fillers are used by which a non-porous and more uniform surface of the paper is achieved. Furthermore, the paper attains brightness and at the same time higher opacity, acquires more bulk and becomes specifically heavier. In general, however, its strength is thereby diminished. A further disadvantage is that large amounts of filler, often 70% and more, are not taken up by the paper pulp. These disadvantages are not avoided when plastics, as, for example, finely ground polyvinyl chloride with a high softening point or finely ground compact urea-formaldehyde resins are used as fillers.

We have now found that the said disadvantages can be avoided by using in the manufacture of paper, hardened and porous polycondensation products derived from aminoplast- or phenoplast-forming compounds and aldehydes. Surprisingly, these hardened porous resins are nearly completely retained in the paper pulp when the sheet is formed about (90%).

As was pointed out above, the use of fillers in the production of paper is not new. By the use of hardened porous polycondensation products of the said kind, however, the paper obtained is loosened and acquires a softer character, whereas the usual mineral fillers fill up the pores in the paper situated between the fibers and impart to the paper a closed structure and a smooth surface.

The porous polycondensation products used are prepared in a conventional manner. Suitable aminoplast-forming compounds include urea, thiourea or their thermal conversion products, as, for example, biuret. Moreover, triazines are suitable, especially triaminotriazine (melamine), but also aminotriazines which contain less than three amino groups, as for example diaminotriazines, and also dicyandiamide, guanamide and its derivatives and also derivatives of the other aminoplast-forming compounds mentioned, for example, N-alkyl- or N-aryl-substituted ureas such as methyl-, ethyl-, propyl- or butyl-urea or phenyl-urea. In general, these aminoplast-forming compounds are reacted with formaldehyde or its polymers, for example paraldehyde, to form aminoplasts, but it is also possible to allow acetaldehyde and possibly propionaldehyde or butyraldehyde to act on the aminoplast-forming compound. The addition or preliminary condensation products of aminoplast-forming compounds and aldehydes prepared from these components must be soluble in water. In general, they consist of methylol compounds of the aminoplast-forming compounds, for example mixtures of mono-, di- and trimethylolureas, but they may be further condensed with the splitting off of water with the formation of ether and methylene bridges provided these products are still soluble in water. The aminoplast-forming compounds may be reacted with the aldehyde in a wide range of proportions. A relative proportion of about 1 mol of urea to 1 to 1.4 mols of formaldehyde has proved to be specially advantageous. For many purposes, however, a greater excess of aldehyde may be used, for example up to 2 or even 2.5 mols of formaldehyde to 1 mol of urea. Conversely, there may also be used condensates which have been prepared with an excess of urea, for example, those which contain up to 1.2 mols of urea to 1 mol of formaldehyde. In general, the amount of aldehyde which is allowed to act on the aminoplast-forming compound is such that there are 0.5 to 2.2 mols of formaldehyde for each amide or amino group. As phenoplast-forming compounds there may be used phenol and its alkyl derivatives, for example mono- or polymethyl-, -propyl- or -butyl-phenols.

During or after the production of the polycondensation products, their aqueous solutions, which in general have a concentration of about 20 to 50% or in some cases even 70%, are foamed up. The foaming up is preferably effected in the presence of a surface-active wetting agent. As such there may be used especially anionic wetting agents such as naphthalene sulfonic acids or alkylnaphthalene sulfonic acids, also esters of fatty alcohols with about 10 to 28 carbon atoms with sulfuric acid or sulfuric acid esters of polyglycol ethers, for example from alkylated phenols, as for example hexyl-heptyl-beta-naphthol with 2 to 10 mols of ethylene oxide, or adducts of sulfuric acid and unsaturated fatty alcohols having ethylenic double linkages, adducts of sulfuric acid and alpha,beta-unsaturated dicarboxylic acids or esters, for example maleic ester, such as sulfosuccinic acid esters, as well as high molecular weight carboxylic acids, especially fatty acids, with about 10 to 28 carbon atoms. Instead of the free acids there may also be used their water-soluble salts, as for example their alkali salts. In principle, however, not only anionic wetting agents can be used but also cationic and non-ionogenic wetting agents, as for example alkoxylated, especially ethoxylated, fatty amines, for example the reaction product from oleyl- or stearyl-amine with 5 to 20 mols of ethylene oxide, and also quaternary ammonium compounds which contain alkyl radicals of high molecular weight, i.e., with about 10 to 28 carbon atoms, and also alkoxylation products of high molecular weight fatty acids or fatty alcohols with about 10 to 28 carbon atoms, especially their hydroxyethylation products which contain 5 to 40 mols of ethylene oxide per mol of fatty acid or fatty alcohol. To this class belongs for example the reaction product of oleyl alcohol with 15 to 25 mols of ethylene oxide. Together with these wetting agents there may also be used protective colloids, such as polyacrylic acid salts or casein. The hardening time is adjusted in the usual way by the amount of hardening agent added. The solidification of the foamed-up resin takes place in a short time. Even after about 30 seconds to a few minutes, the foamed-up resin is present in a solid state in which it is no longer deformable. Especially suitable acid hardening agents are the compounds usually employed for the hardening of aminoplasts, especially inorganic or organic acids or acid salts of these acids. As examples there may be specified sulfuric acid, hydrochloric acid, phosphoric acid, oxalic acid, maleic acid, lactic acid, ammonium chloride, ammonium phosphates, ammonium sulfates or alkali phosphates. The said salts may contain acid hydrogen atoms.

The hardenable foam of the aqueous solution of the hardenable aminoplast, which may contain a wetting agent and the hardening agent for the aminoplast, is then prepared in the usual way. In general, a gas is used as the foaming agent and is led into the solution to be foamed-up. Especially suitable indifferent gases include nitrogen, oxygen, air, carbon dioxide, ammonia or hydrogen sulfide. The aqueous solution to be foamed-up may suitably contain about 15 to 35% by weight of the hardenable condensation product and especially about 25 to 35%. The wetting agent is in general added in amounts between 0.5 and 1.5% by weight with reference to the solution of the condensation product, and the hardening agent advantageously in amounts between 0.5 and 1.5% by weight with reference to the condensation product to be hardened. An excess of the indifferent gas used as foaming agent is non-injurious. Another way of carrying out this usual method is to add the acid hardening agent to the foam which has already been prepared. In this case an aqueous condensate solution may suitably be mixed with a wetting agent, this solution foamed-up in a foaming chamber and the solution of hardener added during the foaming or immediately thereafter with powerful stirring or other movement. It is also possible, however, to foam up an aqueous solution of the wetting agent, to stir or blow the aqueous condensate solution into this preformed foam and then to add the hardening agent at the same time or immediately before the exit of the foam from a spraying nozzle.

The hardenable synthetic resin foam thus obtained hardens in a short time even at room temperature, for example above 10° C., or when desired at elevated temperature up to about 60° C. It may be worked up with the paper fibre pulp in the resulting condition or preferably after drying at temperatures between about 20° and 100° C. and disintegration to a powder. The volumetric weight of the hardened synthetic resin foam is between about 3 and 15 or more kilograms per cubic metre. In general, the particles of the pulverulent porous resin used should have a diameter of not less than 100 microns and preferably more than 500 microns up to several millimetres, especially 1 to 2 millimetres.

It is also advantageous to use surface-active porous synthetic resins from aminoplast-forming compounds and aldehydes in the preparation of which soluble compounds have been coemployed which are then eluted from the hardened foamed resin after the hardening. To these soluble compounds there belong all water-soluble salts and also water-soluble organic compounds, such as sugars, and also compounds soluble in organic solvents in which case water is not used as the extraction agent but an organic solvent which will dissolve the soluble compound used but will not attack the polycondensation product.

The pore structure of the porous synthetic resin foam may be changed by adding softeners during the preparation of the porous polycondensation products, either during the preparation of the non-porous resins or during the foaming-up of their aqueous solutions.

The porous pulverulent resins are used in amounts between about 5 and 80 and possibly 100% by weight with reference to the weight of the paper. The strength of the paper is diminished less than is the case when using equal amounts of a known mineral filler. In the case of relatively small additions, for example up to 10%, the paper may still be sized well.

The proposed fillers may be incorporated for example after beating the pulp in the beater with the beating roll raised or also in the vat. They become well wetted and consequently are dispersed rapidly and uniformly.

For the making of the paper any conventional raw material can be used, i.e., ordinary wood pulp obtained by the sulfite or sulfate processes, either bleached or unbleached and with or without additions of mechanical pulp (these additions, if any, amounting to 85%); a pulp obtained from annual plants, as for example straw and grasses, for example esparto; or from rags, for example linen rags. Depending on the use for which the paper is designed, the fibrous materials may be beaten to any required degree of freeness.

For the sheet formation any of the conventional machines may be used, i.e., those equipped with Fourdrinier wires, cylinder molds or combined machines comprising both Fourdrinier wires and cylinder molds. When the sheet has formed on the wire, it passes on a felt through one, two or three presses. The pressure exerted by the rolls is about 30 to 50 kg./cm. of the roll width, unless voluminous papers are to be obtained. Slight pressure is preferred in the practice of our invention and accordingly the very weight of the rolls will often do as a pressure load for the paper web passed through between them. But even slighter pressures may be used. The advantage achieved by the said technique lies in the fact that the paper, while leaving the press with an elevated moisture content, thus obtains an optimum bulk index.

The papers obtained are more porous and more voluminous than those prepared with the addition of the known fillers. They are therefore eminently suitable for the production of absorbent papers and also filter papers for gases, vapours and liquids. The proposed process is also of importance for the production of linings for paperboards and cardboards. The surface of the paper obtained is resistant to rubbing and has a high bulk. The papers may be colored uniformly and well irrespective of whether the paper pulp or only the hardenable synthetic resin foam is pigmented. The finished dried paper may also be colored or improved subsequently in other known ways.

The proposed fillers may be used together with the mineral fillers hitherto usual in the production of paper, for example with china clay, satin white, blanc fixe and titanium white. Papers with a smooth surface are thereby obtained. Especially favorable results are obtained by incorporating the mineral fillers in the synthetic resin foam during its production, for example in the weight ratio of up to 1:1, before it is hardened. Other substances employable as fillers may also be added such as metal powders, metal oxides or metal salts.

The addition of the porous hardened aminoplast or phenoplast resins in the manufacture of paper has the further advantage that the small amounts of these fillers which are not taken up by the pulp clarify the white water.

By the addition of porous polycondensation products according to this invention, the combustibility of the paper is considerably lessened. The porous polycondensates used may be colored so that colored papers are obtained. The larger the amount of porous polycondensation product used, the less resistant to rubbing is the paper obtained. If relatively small amounts of the porous polycondensates or if porous polycondensates of relatively great density are used, papers are obtained which are more resistant to rubbing. The papers obtained may obviously be aftertreated in the manner usual for this purpose.

All the usual kinds of paper may be prepared with the proposed fillers.

The following examples will further illustrate this invention but the invention is not restricted to these examples.

*Example 1*

A half stuff for the production of printing paper, prepared in the usual way has added to it, after beating in the beater is finished, 5% of a pulverulent porous urea-formaldehyde resin prepared in known manner, with reference to the pulp, and mixed thoroughly with the roll raised. From this mixture, a specially soft and voluminous paper is obtained on the paper machine.

*Example 2*

A middles material for the production of cardboard is mixed, preferably in the vat, with 10% of the porous resin used in Example 1, with reference to the middles material. By the porous filler used, a specially good dehydration is effected on the cylinder mold. The thickness of the middles increases by 50 to 100% so that a corresponding amount of middles material can be saved.

*Example 3*

40% of the porous resin powder according to Example 1 is added to bleached pulp for the production of filter paper, with reference to the pulp. An extremely porous filter paper is obtained of which the thickness has increased by four times the amount by the filler.

*Example 4*

Into a pulp mass of unbleached finely ground soda pulp there is blown in flock form from a foaming apparatus such an amount of a foamed-up urea-formaldehyde condensation product in the state of its formation that a noticeable thickening of the final mass is observable. The 5% pulp mass in the beater thickens and the volume of the mass in the beater increases considerably. The amount of urea-formaldehyde condensation product is about 10% of the amount of cellulose. The mass thus worked up is led over a sieve, dehydrated and, after passing a press, dried. A highly voluminous paper is formed.

*Example 5*

An unbleached soda pulp which has been ground to a degree of freeness of 30° SR (determined according to the method of Schopper-Riegler) is mixed with 30% of the pulverulent urea-formaldehyde resin used according to Example 1. The synthetic resin powder is preferably first stirred with water and then added at the sand trap of the paper machine. A very voluminous paper is obtained which consequently is suitable as a sound-absorbing material (wallpaper).

*Example 6*

The larger the proportion of porous synthetic resin powder used, the more permeable to air is the paper obtained. This relation may be seen from the following table.

| Percent of synthetic resin powder: | Air permeability in ccs. of air per minute |
|---|---|
| 0 | 272 |
| 2 | 423 |
| 4 | 680 |
| 6 | 790 |
| 8 | 1165 |
| 10 | 1219 |

The measurement of the air permeability values is carried out with paper sheets having the weight 150 grams per square metre of unbleached sulfite cellulose beaten to a fineness of 30° SR with the Schopper's air permeability tester with a clamped surface of 10 square centimetres and a pressure difference of 40 millimetres water column.

By adding only 10% of foamed-up hardened aminoplast, with reference to pulp, the air permeability is increased by 4.6 times. The papers obtained are therefore especially suitable for the production of gas filters, for example for air-conditioning plant, vacuum cleaners or cigarettes.

*Example 7*

To a bleached pulp which has been beaten to a freeness of 25° SR there are added 8% of a 40% solution of a cationic urea-formaldehyde resin and also 3% of aluminum sulfate. Then water is added and also 10% of the dry resin powder used in Example 1, or the same powder triturated with water, with reference to the pulp. A voluminous absorbent paper is obtained with a wet strength of 25 to 30%. It will suck up water at a substantially greater speed than a conventional paper and consequently it is suitable for the production of absorbent substrates of all kinds, such as shoe linings or linings in buildings.

*Example 8*

A bleached pulp beaten to a fineness of 35° SR is mixed with 5% of a substantive invert soap. Additionally, there is also added to the so-called back water, 40% of the resin powder used in Example 1. The resultant mixture is worked up to paper on a paper machine with automatic pick-up device and felt transfer. A very absorbent and bactericidal paper is obtained.

*Example 9*

For the production of a multilayered cardboard with a low bulk density, the middles material made from prepared waste paper is mixed with 20% of a pulverulent porous phenol-formaldehyde resin prepared in the usual way. The covering layers are prepared, as usual, from beaten and unbleached soda pulp with the addition of rosin size, aluminum sulfate and 10% of the same pulverulent porous phenol resin. The cardboard obtained after working up this mixture on the cylinder machine, has a bulk density which can be up to 50% less than that of the usual cardboards.

We claim:

1. A process for producing improved high bulk cellulosic paper which comprises: adding to a cellulose paper stock from about 5% to about 100% by weight of a particulate porous hardened polycondensation product of a compound selected from the group consisting of aminoplast- and phenoplast-forming agents and an aldehyde, said quantity being based on the dry weight of the paper stock, said porous hardened polycondensation product having a particle diameter of from about 100 microns to about 2 millimeters; and thereafter forming a paper sheet from said stock.

2. A process as in claim 1 wherein the porous hardened polycondensation product is formed from urea and formaldehyde.

3. A process as in claim 1 wherein the porous hardened polycondensation product is formed from phenol and formaldehyde.

4. A process for producing improved high bulk cellulosic paper which comprises: adding to a cellulose paper stock from about 5% to about 100% by weight of a particulate porous hardened polycondensation product of a compound selected from the group consisting of aminoplast- and phenoplast-forming agents and an aldehyde, said condensation product having a weight of from about 3 to 15 kilograms per cubic meter, said quantity being based on the dry weight of the paper stock, said porous hardened polycondensation product having a particle diameter of from about 100 microns to about 2 millimeters; and thereafter forming a paper sheet from said stock.

5. A high bulk paper sheet of cellulosic fibrous material, said paper sheet being filled with from about 5% to about 100% by weight of a particulate porous hardened polycondensation product of a compound selected from the group consisting of an aminoplast- and phenoplast-forming agents and an aldehyde, said quantity being based on the weight of the cellulose fibers, said polycondensation product having a particle diameter of from about 100 microns to about 2 millimeters.

6. A paper sheet as in claim 5 wherein said porous hardened polycondensation product is produced from urea and formaldehyde.

7. A paper sheet as in claim 5 wherein said porous hardened polycondensation product is produced from phenol and formaldehyde.

References Cited in the file of this patent

UNITED STATES PATENTS

| | | |
|---|---|---|
| 2,221,945 | Hanson | Nov. 19, 1940 |
| 2,323,831 | Menger | July 6, 1943 |
| 2,559,891 | Meyer | July 10, 1951 |
| 2,631,098 | Redfern | Mar. 10, 1953 |
| 2,634,207 | Miscall | Apr. 7, 1953 |
| 2,705,197 | Seybold | Mar. 29, 1955 |
| 2,807,595 | Brown | Sept. 24, 1957 |
| 2,845,396 | Krebs | July 29, 1958 |
| 2,881,088 | Schulenburg | Apr. 7, 1959 |